United States Patent
Blakeley

[11] 3,761,114
[45] Sept. 25, 1973

[54] PIPE TO FLANGE COUPLINGS

[75] Inventor: James Blakeley, Thornhill, Ontario, Canada

[73] Assignee: Victaulic Company of Canada Ltd., Ontario, Canada

[22] Filed: Aug. 30, 1971

[21] Appl. No.: 176,033

Related U.S. Application Data

[63] Continuation-in-part of Ser. No. 823,282, May 9, 1969, abandoned.

[52] U.S. Cl. ............... 285/111, 24/249 R, 285/368, 285/38 Z, 285/415
[51] Int. Cl. ............................................ F16l 17/00
[58] Field of Search .................. 285/368, 415, 414, 285/413, 412, 112, 382, 111, 110, 410, 411, 408, 407, 366, 367, 337, 233, 283, 363; 277/205; 24/249 R, 249 HA, 249 WL, 249 FP, 249 LS, 249 LL, 249 SL, 249 PP, 249 PC, 24, 132 R

[56] References Cited
UNITED STATES PATENTS

| | | | |
|---|---|---|---|
| 1,893,841 | 1/1933 | Merritt | 285/368 X |
| 3,551,006 | 12/1970 | James | 285/368 X |
| 1,683,076 | 9/1928 | Johnson et al. | 285/112 |
| 2,449,795 | 9/1948 | Stillwagon | 285/112 X |
| 3,415,547 | 12/1968 | Yano | 285/415 X |
| 3,287,034 | 11/1966 | Bragg | 285/382 X |
| 3,024,046 | 3/1962 | Frost et al. | 285/112 X |
| 1,784,667 | 12/1930 | Gillet | 285/415 X |
| 2,467,061 | 4/1949 | Mason | 277/205 X |

Primary Examiner—Thomas F. Callaghan
Attorney—Albert M. Parker

[57] ABSTRACT

Rigid coupling of a length of pipe to another length having a flange at its end or to piping appurtenances having a flanged end by employing a pressure responsive gasket formed to seal on the cylindrical surface of the first pipe length and against the surface on the flange of the other pipe end at right angles thereto. The gasket is housed in a readily applicable coupling member which has provision for engaging the pipe outwardly of the gasket and which includes a flange portion mated to the flange on the end of the other pipe section. The mated flanges have aligned bores for the passage of bolts therethrough to secure them in position for the basket to be effective. The coupling housing may be of two or more segments of a cylinder hinged together to form a complete cylinder with a key section to seat in a groove formed in the pipe. Spaced teeth may be provided on the key section for "rigid" coupling, or the leading edge of the key section may have a rounded contour for closer fit in a groove.

9 Claims, 19 Drawing Figures

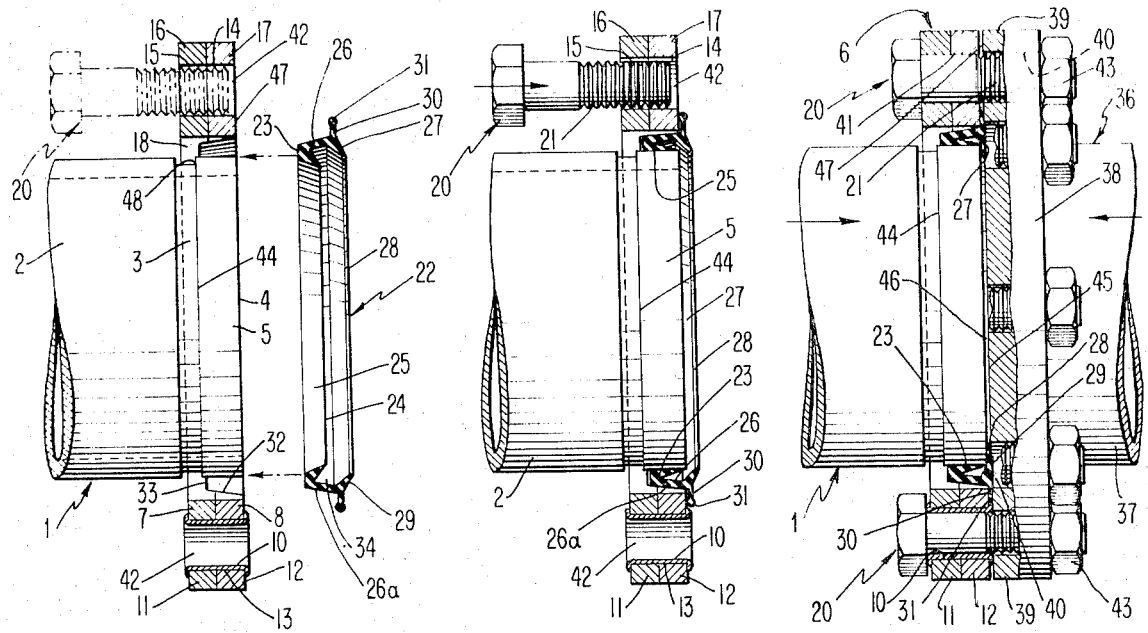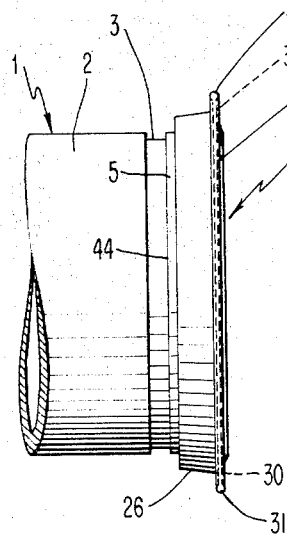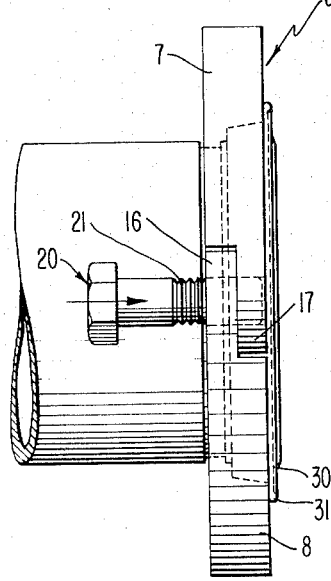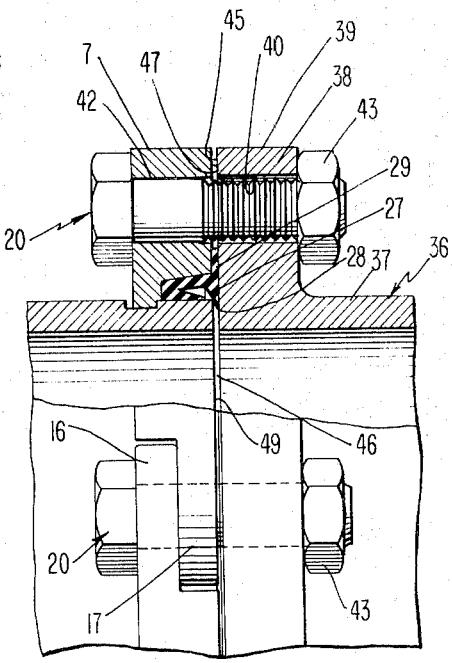

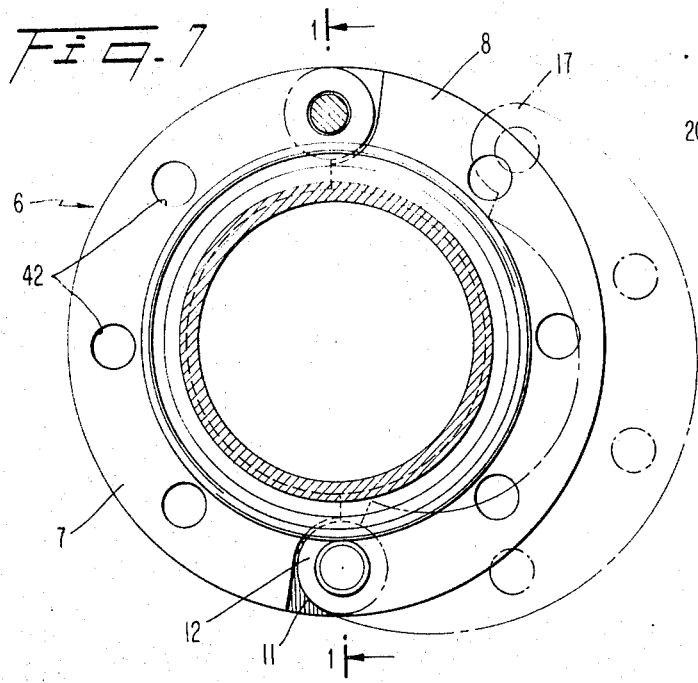
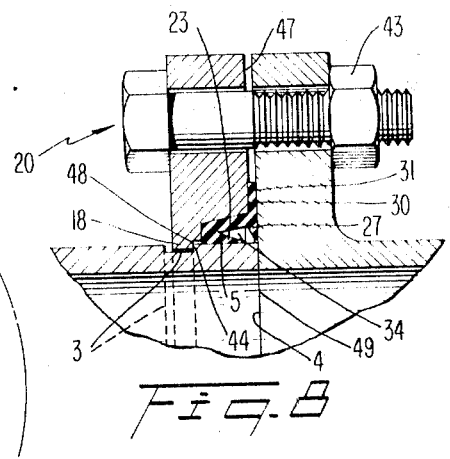
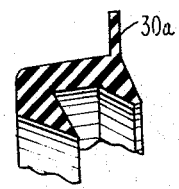
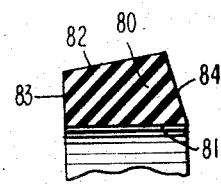
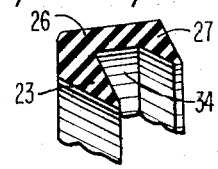
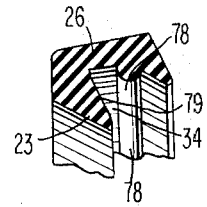
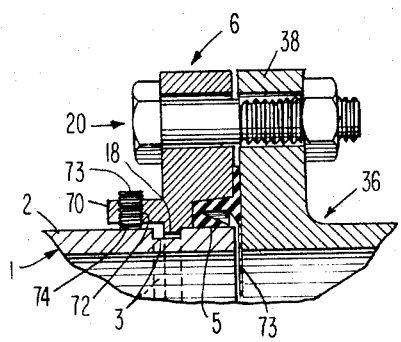

PIPE TO FLANGE COUPLINGS

CROSS REFERENCE TO RELATED APPLICATION

This application is a continuation-in-part of my application Ser. No. 823,282 filed May 9, 1969 and now abandoned.

BACKGROUND OF THE INVENTION

1. Field of the Invention

This invention is concerned with the joining together of lengths of pipe or other piping appurtenances, such as valves, controls, pumps, and other equipment where dissimilar end preparations exist. As an example, where one of the pipe lengths or appurtenances has a flange at its end with holes therethrough to receive bolts for securement to an opposed flange on another pipe length but where the other pipe length has no comparable joining flange some means must be provided for joining these lengths together. The coupling arrangement of the invention provides a joint which is "rigid" in that it does not allow relative motion of the pipe lengths in the angular, linear or rotational sense.

2. Description of the Prior Art

In the prior art when a first flange pipe-like member had to be secured to a second pipe member or length lacking any comparable flange or other securing means it was necessary to either weld a mating flange onto the end of the second pipe, thread the pipe and screw on a flange, or thread the pipe for the reception of various adapter pieces to build up a connection with the existing flange on the first member. All of these arrangements were time consuming, expensive, took up space, and employed large flat gaskets. Such gaskets were expensive, had to be applied and secured exactly and with uniform pressure if a tight joint was to be achieved. Gasket securement in prior art arrangements had to be checked periodically lest leakage or blow-out should take place.

SUMMARY OF THE INVENTION

The invention enables the quick effective and economical coupling of pipes to flanged elements whether on other pipes or on piping appurtenances. It does so by employing a small gasket either of the pressure responsive type, or solid, and readily deformable, which gasket is housed in a readily applicable coupling housing, has one surface engaged with the cylindrical surface of the pipe and another surface formed to engage the face of the flange extending ar right angles, or radially with respect to such pipe surface.

The readily applicable coupling housing which houses the gasket is preferably formed with a key section which seats in a groove formed around the outer surface of the pipe so as to position the housing on the pipe. The coupling housing also extends radially outwardly to form a flange which is mated to the flange of the adjacent element for bolting thereto.

The housing of the gasket and the manner in which it engages the receiving surfaces on the pipe and the flange, particularly if it is the pressure responsive type, assures that with a minimum of gasket material a tight joint will be achieved and maintained since it is the pressure in the pipe which assists in maintaining the gasket tight. The gasket may advantageously include an element extending part way radially outwardly between the opposed flanges.

The readily applicable coupling may be secured to the pipe by being made up of two hinged hemi-cylindrical elements secured in cylindrical position by the bolting with key sections seated in the pipe grooves.

The invention also comprises the various methods for applying these various readily applicable couplings and assembling them with an already flanged pipe end or accessory.

It is accordingly a principal object of the invention to provide readily applicable coupling means for rigidly joining unflanged pipe ends to flanged ends of pipe or accessories.

Another object is to provide for the effecting of said joints in a simple quickly applicable manner.

Still another object is to provide for the effecting of said joints while sealing them with a minimum of gasket material.

A still further object is to provide for the sealing of such joints in a pressure responsive self tightening manner.

Further and more detailed objects of the invention will in part be obvious and in part be pointed out as the description of the invention taken in conjunction with the accompanying drawing proceeds.

In that drawing:

FIG. 1 is a partially exploded vertical section taken on line 1—1 of FIG. 7 and looking in the direction of the arrows showing hinged flanged coupler housing segments positioned in place over a grooved pipe end with a key section received in the groove and with the gasket positioned to be moved into engagement with the pipe section outwardly of the groove.

FIG. 2 is a similar view showing the gasket seated in place on the pipe ready for engagement of the pipe with a flanged pipe end.

FIG. 3 is a similar view but including an opposed flanged pipe end showing such flange and the flanged coupler housing bolted together, with the flange on the pipe partially broken away to expose the actual joint.

FIG. 4 is an elevational view of a section of grooved pipe with a gasket already positioned in place thereon illustrating the first step in another method of effecting the joint while employing hinged flanged coupler segments.

FIG. 5 is a similar elevational view, with the flanged hinged coupler positioned and swung into closed position in place over the gasket and pipe section of FIG. 4 ready for securement to a flanged pipe end.

FIG. 6 is a part sectional, part elevational view showing the completed joint between a pipe section equipped with a flanged coupler as in FIG. 5 and a flanged pipe section.

FIG. 7 is an end elevational view of a section of grooved pipe with the hinged flanged coupler housing of FIGS. 1, 2, and 5, applied thereto and shown in closed up position in solid lines and in somewhat open position in dot-dash lines.

FIG. 8 is a fragmentary vertical longitudinal sectional view of a joint of opposed flanges in accordance with the invention with the pipe ends abutted to form a rigid joint.

FIG. 9 is a view similar to FIG. 8 but illustrating a construction for effecting either a rigid or a flexible joint.

FIGS. 10, 11, 12 and 13 are vertical sections taken through modified forms of gaskets showing their formations in unstressed condition.

Figure 14:
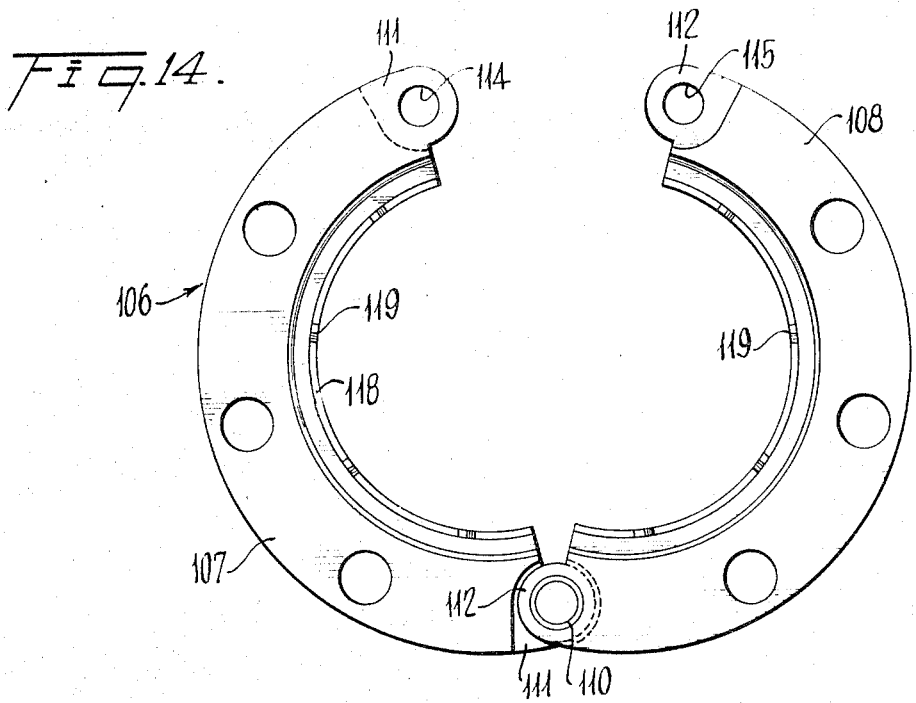
FIG. 14 is an end view of the coupler housing of FIG. 7 showing the location of teeth on the key section.

In the joining of a pipe grooved for coupling with a flanged pipe, or to the flange of a piping accessory by means of a hinged flanged coupler housing, two methods of proceeding may be employed while utilizing all the same structural elements of FIGS. 1–7. One of these methods is illustrated in FIGS. 1,2,3 and 7, and the other in FIGS. 4,5, and 6. The difference between the two methods lies in the sequence of the steps followed in relation to the application of the gasket. However the elements and the reference characters applied to them remain the same throughout Considering the method and construction of FIGS. 1,2,3, and 7, there is first the pipe length, generally indicated at 1, having a main portion 2 which has an exterior circumferential groove 3 formed thereinto at a position spaced back from the end 4 of the pipe by the extent of the portion 5 serving as a gasket seat. This portion 5, provides a seat for the leak-proof engagement of one lip of a pressure responsive gasket therewith.

The groove 3, here illustrated as of the type that is cut into a pipe is employed when the pipe is of sufficient thickness to accept the cut without weakening the pipe beyond an allowable extent. The hinged flanged coupler of the invention, which may also be considered as a coupling housing since it provides a recess for the reception of the gasket is indicated at 6 in FIG. 7 as a complete annulus, but it is actually made up of the two half annuli or hemi-cylinders 7 and 8. These half annuli 7 and 8 are hinged together at the bottom position as seen in FIGS. 1, 2, 3, and 7, by means of a sleeve 10 which passes through aligned bores in small overlying end segments or hinge leaves 11 and 12 of the half-annuli 7 and 8 respectively. Each of the end portions 11 and 12 is reduced to half the normal thickness of the complete annulus 6 so that together they make up the full thickness of the annulus. The sleeve 10 serves as a hinge pin and enables the two halves of the annulus to be swung between open and closed positions for accurate placement of the annulus on the pipe prior to the inclusion of the securing bolts.

The bore 13 extending through the portions 11 and 12 of the segments 7 and 8 is sufficiently large for the sleeve 10 to have an inner diameter the same as that of the other bore holes through the flanged coupler 6. However, the first bolt to be applied is that at the opposite end of the diameter of the coupler from the hinge sleeve 10. Here again, for a sufficient extent surrounding the bolt holes 14 and 15, the segments 7 and 8 have end portions whose thickness is reduced in half. At this position the thinning-out or recessing of the end portions is reversed with the segment 8 being recessed back from the front for one half of its thickness as viewed in FIG. 7, to provide the rear end segment 16, while the segment 7 is recessed forwardly from the rear for half its thickness to provide the front end segment 17.

Once the full segments 7 and 8 are swung into correct closed position with their radially inwardly extending complete annular key section 18 properly seated in the groove 3, the bolt holes 14 and 15 will be aligned ready for the accurate insertion of a fitted first bolt generally indicated at 20. As soon as the threaded portion 21 of the bolt 20 is seated far enough into the bores 15 and 14 to lock them together without passing all the way through the hole 14, the gasket, generally indicated at 22, is seated in place on the pipe surface 5 and within the coupler. This gasket, generally of C shape cross-section in its body part, is an annulus having a flexible lip 23 inclined from where it departs from a base or joining section 26 towards a vertical radial plane passed through the center of the gasket as viewed in FIG. 1. This lip 23 diminishes in thickness to a line like inner edge 24 and provides an exterior surface 25 for engagement with the surface 5 of the pipe. At the other end of the joining section 26 another lip 27 extends out at an incline away from the central vertical plane of the gasket. The lip 27 terminates in an end edge 28, and provides an exterior surface 29 for engagement with the flange of the flanged pipe with which a joint is to be effected. In addition, in the form of the gasket here illustrated, an outwardly extending rib 30 terminating in a somewhat enlarged bead 31 extends from the position where the lip 27 joins the base 26.

Another feature of the gasket to note is that the joining portion 26 has its outer surface 26a formed as a conical section inclined to the left as viewed in FIG. 1, which incline is formed to substantially mate with a similar inclined surface 32 formed on the inner surface of the flanged coupler 6. As seen in FIG. 1, the surface 32 inclines inwardly to an abutment 33 which when the coupler is installed on a pipe, closes off and completes the recess between the surface 32 and the outer surface 5 of the pipe.

The gasket 22 is made of suitably resilient rubber, or of synthetic rubber-like material. It can be made from such material inert to the chemical action of fluids flowing past the joint while being sufficiently resilient to make an initial tight seal with the surfaces engaged by it regardless of pressure within the pipe.

Before going on to the next step it is important to note that there is a rather substantial cavity 34 within the gasket bordered by the lips 25 and 27 and the joining portion 26. This plays an important part in the effectiveness of the gasket inasmuch as the interior of the cavity 34 is normally subjected to the same pressure as exists within the pipe. Even though in the present instance the cavity 34 is largely closed up when the joint is completed there is nevertheless sufficient cavity space in the case of either a flexible joint with spaced pipe ends, or a rigid joint with engaged pipe ends which do not necessarily meet in a leak-proof manner, for the interior or cavity of the gasket to receive and respond to pressure within the pipe. This causes the gasket lips to seal more tightly against their engaged surfaces as the pressure within the pipe and hence within the gasket increases. Thus any tendency of a pressure condition to create leakage is counteracted by the action of the gasket itself.

Turning now to the showing in FIG. 2 it will be seen that the gasket has been inserted into the recess provided for it by the opposed surfaces 5, 32 and 33. In many instances this is the preferred way of proceeding, since the recess provides a guide for a workman to follow in effectively positioning the gasket. When the gasket is so positioned it will be seen that its lip 23 has been inclined further towards the vertical plane with its engaging surface 25 lying snugly against the cylindrical gasketing section 5 of the pipe. This positioning has been effected against the resilience of the gasket and its tendency to return to its initial position holds it tight. All of the lip 23 and the joining portion 26 practically to the rib 30 are seated snugly within the recess bordered by the surfaces 5, 32, and 33. The lip 27, however, maintains its original direction with its edge 28 lying approximately in alignment with the exterior surface 5 of the pipe. The rib 30 and the bead 31 extend outwardly to overlie the face of the flanged coupler between the recess surface 32 and the bolt holes extending through the outwardly flanged part of the coupler.

Proceeding on to FIG. 3 with reference to FIG. 7 for a showing of the positions where bolts will be passed through the coupler, a completed joint is shown wherein another pipe section 36 flanged outwardly from its normal body 37 in the end flange 38 is bolted to the flanged coupler 6. As seen by its periphery 39 the flange 38 has the same radial extent as the coupler 6 and has bolt holes 40. The holes 40 are the same in number, have their centers on the same radius, and are positioned the same as the holes 42 in the flanged coupler. Bolts 20 are seated in the aligned holes with their shanks 41 located in the holes 42 formed in the flanged coupler which holes are all the same whether formed in solid segment material, formed of the hole portions 14, 15 or formed in the sleeve 10. The shanks 41 fit the holes 42 snugly. Bolts are inserted through all of the aligned holes in the flanged coupler and through the holes 40 in the flange 38 to receive the nuts 43. The nuts 43 are tightened up uniformly on the threaded portions 21 of the bolts to draw the flange and flange coupler together with their opposed face surfaces merely being separated by the rib 30 and the bead 31 which bead as seen in FIGS. 3 and 6, is then flattened out.

Referring to FIGS. 3 and 6, it will be seen that when the flange 38 and the flanged coupler 6 are drawn toward each other by the tightening of the nuts 43 the lip 27 on the gasket 22 engages the face 45 of the flange 38. The lip 27 is swung toward a radial plane until its outer surface 29 lies flat against the end face surface 45 of the flange 38. The surface 29 seals against the surface flange 45 in the same resilient pressure responsive manner as the surface 25 seats against the surface 5. Whether the free end edge 28 of the gasket closes off the gap 46 between the opposed flange faces is not important, for that is not the basis on which the gasket functions. The edge 28 might close up the gap 46 at some positions but not at others, due to the fact that the elements used in laying a pipeline may readily have somewhat rough or rather undulated surfaces when contrasted with machined surfaces. Furthermore, the presence of the rib portion 30 and bead 31 between the opposed faces 45 of the flange 38 and 47 of the flanged coupler 6, though the bead 31 is normally flattened out between those faces, still serves in the construction here shown to keep the faces spaced a certain distance apart.

Reverting now to the showing in FIGS. 4 and 5 in conjunction with the showing in FIG. 6, which latter is also common to FIGS. 1, 2, and 3, the showings in FIGS. 4 and 5 are merely concerned with a different method of applying the flanged coupler of FIGS. 1–3 to join a pipe section with a flanged pipe or other flanged element. The parts remain the same so they are given the same reference characters. The difference resides, as seen right away from FIG. 4, in that the gasket 22 is seated on the surface 5 of the pipe 1 before rather than after the flanged coupler 6 is brought into position. Under certain circumstances it is easier to seat the gasket on the pipe first, but on the other hand, care must be taken no to slide it on too far lest it overlap into the groove 3 and hinder the application of the flanged coupler. However, the workman who uses any reasonable degree of care can readily see when the inner face of the gasket approaches the edge 44 of the groove 4 and will stop there.

With the gasket 22 properly seated, the flanged coupler can be quickly brought into place by swinging the segments 7 and 8 open about the sleeve hinge 9, then closing them up to seat the key section 18 in the groove 3. Then the bolt 20 is fed through the bores 15 and 14 to sufficient extent to lock the flanged coupler in place on the pipe ready for the coupler to be brought up against the flange 38 of a pipe 36 as seen in FIG. 6. The assembled joint of FIG. 6 has the same structure as that of FIG. 3, with the FIG. 6 joint merely having been rotated 45° about the axis of the pipe toward the viewer.

From the foregoing it will be apparent that the invention readily accomplishes the objective of making a leak tight joint between the surfaces of a pipe and a flange extending at right angles to each other. Also the objective is accomplished in a simple economical manner.

One provision for eliminating flexibility and providing a rigid coupling while using the coupling elements as heretofore described is illustrated in FIG. 8. In FIG. 8 the distance of the "A section," that is the width of the band 5 between the end 4 of the pipe and the adjacent face 44 of the key section 18, is considerably greater than the distance from the end surface 47 of the flanged coupler to the side surface 48 of the key section 18 engaging the grooved wall 44. With this distance arrangement the end 4 of the pipe projects out beyond the flanged surface 47. Hence when the nuts 43 are tightened up on the bolts 20 the end surfaces 4 and 49 come into tight engagement before the rib 30 and the bead 31 are squeezed and extended radially to any substantial extent. Further tightening would not accomplish anything due to the metal contact between the surfaces 4 and 49. Again the lips 27 and 23 have been swung towards each other at their ends to somewhat close in the mouth of the cavity 34, and certainly to sufficient extent to make a tight seal and maintain that seal no matter how much of the fluid within the pipe, whether or not under substantial pressure, escapes past the metal surfaces 40 and 49 to make itself felt within the cavity 34. Further provisions for preventing relative motion and assuring rigidity are discussed hereafter in connection with FIGS. 14–19.

Attention is directed to the fact that though the element 36 is shown as a short section of pipe, it may, besides a pipe length with a flanged end, be any one of a considerable number of accessories employed in the set up of pipe lines. Common ones of these having coupling flanges carried by parts comparable to short pipe sections are valves, pumps, elbows, T's and various other fittings. Also, though the groove 3 in the pipe 1 is shown and described as the type formed by cutting into the pipe, it is to be understood that for installations where light wall pipe and tubing can be employed, the grooves may be rolled into the pipe. The invention is also applicable to such as cast iron pipe with shouldered ends, where the shoulders serve the purpose of the grooves, engage the near surface of the key and provide "A dimensions" for gasket engagement, functioning the same as does grooved pipe.

An alternate manner of forming a rigid flanged coupler is illustrated in FIG. 9. Here the flanged coupler segments such as 7 and 8, have lugs 70 cast integrally therwith and extending from the outer face 71 thereof parallel to the axis of the flanged coupler and at a position sufficiently above the key section 18 to lie slightly above the outer surface of the pipe 2 to the left from the groove 3. There is a series of these lugs 70 evenly spaced about the flanged coupler 6. Each has a tapped hole 72 therethrough for the reception of a set screw 73, which may be of the Allen head type if desired. The arrangement is such when the screws 73 are screwed down through the lugs 70 their heads 74 come into engagement with the outer surface of the pipe and, inasmuch as there is a plurality of them at spaced positions around the flanged coupler the tightening of all such screws will result in rendering the connection between the flanged coupler and the pipe a rigid one.

It is to be noted however that there is a substantial gap 75 between the end of the pipe 1 and the opposed end of the flanged element 36 which would normally allow for flexibility. Such flexibility can be achieved merely by backing up on the set screws 73 to retract their ends 74 up into the lugs 70. Then there is space between the bottom surface of the lugs and the outer surface of the pipe to allow for all the flexibility needed.

Gasket formation and reception in the FIG. 9 construction is the same as those heretofore described so the portions bear the same reference characters and no repetition of their description is necessary.

Various alternate forms of gasket are shown in cross-section in FIGS. 10-13. Those in FIG. 10 to 12 have the same basic configuration as the gasket 22 already described in detail, so common parts will be given the same reference characters and only the differences will be pointed out. Thus in FIG. 10 the only difference is in the elimination of the bead 31 of the gasket 22 and the elongation of the rib, here indicated as 30a, to extend as far as the rib and bead combination of the gasket 22. This can be advantageous in situations where the fit is closer, where there is no need for the full body of material carried by the bead 31 and where that body might provide somewhat of a hinderance against effective tightening of the joint.

In the FIG. 11 gasket the bead and rib (30, 31) are eliminated entirely thus placing full reliance upon the engagement of the outer surfaces of the lips 23 and 27 with the pipe surface and flange and the consequent deformation of these leps with a partial closing up of the cavity 34 in the tightening of the joint. In many instances such a gasket provides all the sealing necessary for a tight leak-proof joint.

In FIG. 12 an inwardly extending bead or projection 78 is provided extending into the cavity 34 from the position where the lip 27 and the base 26 would otherwise meet at an angle. In these instances where the effecting of the joint results in the gasket cavity being substantially closed up, the bead 78, when the lips 23 and 27 are moved in towards each other, will come into engagement with the inner surface 79 of the lip 23. This will thus seal off or fill up the inner portion of the cavity while leaving an outer cavity so that pressure within the pipeline can still be effective against the extending portions of the lips 27 and 23.

A solid gasket, generally indicated at 80, is shown per se in FIG. 13. Having no cavity this gasket of course has a greater body than that of those previously described as it needs to completely fill and somewhat overlap the recess formed to receive it. For full effectiveness the gasket 80 between its interior surface 81 and its exterior surface 82 should preferably somewhat overfill the space provided for it.

Such a solid gasket is advantageously imployed when the surface of the flange with which it is to be engaged is relatively rough. In such case it is desirable to have the gasket forced more strongly against the flange than would be the case were an unsupported resilient lip 27 being relied upon. Also, for the purpose of better conforming to the roughness of the flange the solid gasket can well be made of softer and more resilient material than would be the gaskets of C shape in cross section previously considered.

It has been found that a toothed coupler according to FIGS. 14–17 has advantages over the coupler illustrated in FIGS. 1–7 for applications where a rigid joint is desirable. In such a rigid joint which permits no relative motion of the coupled pipes or pipe appurtenances, it is often particularly desirable to prevent rotational motion. Such devices as gate valves, butterfly valves of the wafer or flanged type, check valves and miscellaneous other piping components are often subject to external operating loads, and may have displaced centers of gravity which might cause relative rotation of the components with respect to a grooved or shouldered pipe or fitting. The toothed coupler of FIGS. 14 –17 prevents such rotation and avoids the needs to support appurtenances against rotational movement.

In the arrangement shown in FIG. 8 rigidity was achieved by forcing a grooved pipe end hard against the face of the opposing flange in a longitudinal direction by tightining of bolts and nuts 20 and 43. The width of a band 5 determined the degree of interference between the surfaces and hence the degree of rigidity achieved.

Reference is now made to FIG. 14 which illustrates an improved hinged flanged coupler which differs from the housing shown in FIGS. 1–7 in that a plurality of means are provided for insuring a "rigid" coupling. The coupler of FIG. 14, generally indicated by the reference character 106, is made up of two half annuli 107 and 108 which are hinged together by means of a sleeve 110 which passes through aligned holes or bores in small overlying end segments or hinge leaves 111 and 112 of the half-annuli 107 and 108 respectively. Each of the end portions 111 and 112 is reduced to half the normal thickness of the complete annulus 106 so that together they make up the full thickness of the annulus. The sleeve 110 serves as a hinge pin and allows the two halves of the annulus to be swung between the open position of FIG. 14 and a closed position when the coupler is to be fastened at a pipe joint by means of securing bolts in the manner described with respect to FIGS. 1-7.

The relative dimensions of the bore hole through which the sleeve 110 passes and of the other bore holes for receiving securing bolts may be as recited in connection with FIGS. 1-7, and as in that embodiment, bolt holes 114 and 115 are preferably accurately positioned for the insertion of a fitted bolt for precise and tight fit at a pipe joint.

Figure 15:
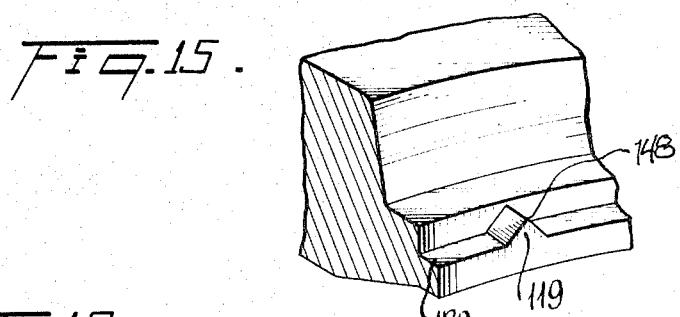
FIG. 15 is an enlarged detail view in perspective of the coupler housing of FIG. 14 illustrating the structure of the key section and a tooth.

As shown in FIGS. 14 and 15 both half-annuli 107 and 108 have integrally formed inwardly extending key sections 118.

Figures 16, 17:
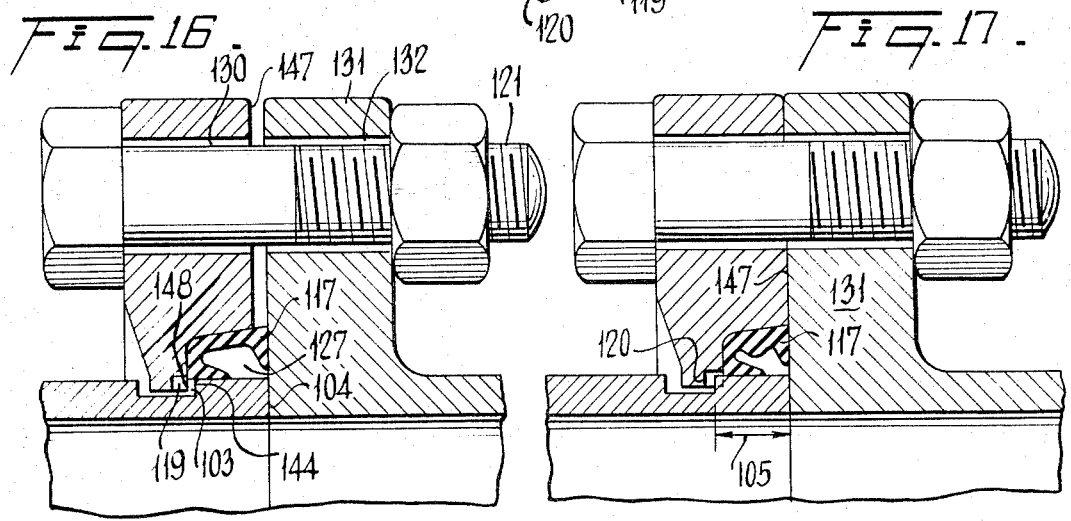
FIG. 16 is a fragmentary vertical longitudinal sectional view showing a coupler housing before it is tightened in place.
FIG. 17 is a view similar to that of FIG. 16 but with the coupler in its final, tightened position.

The key section 118 extends radially inwardly for engagement with a groove 103 in a pipe section 104 to be joined to a flanged piping component as shown in FIGS. 16 and 17. A smoothly curved annular recess 127 for the reception of a gasket 117 is afforded adjacent the key section 118.

Extending forwardly from the face 120 of the key section 118 are teeth 119. The teeth 119 can most conveniently be integrally cast with the main body of the coupler 106 but might also, if desired, be attached by other means. As shown the teeth 119 may preferably form an acute angle at their sharp points for digging into the pipe material. FIG. 14 shows an embodiment having eight equally angularly spaced gripping teeth 119, but a greater number of teeth could be provided if desired.

FIG. 16 shows the coupler of FIGS. 14 and 15 positioned around the groove 103 on a pipe end. A locking or securing bolt 121 has been inserted through mating bolt holes 130 and 132 of the coupler 106 and the flange 131 of an element to which the grooved pipe is to be secured.

The generally C-shaped gasket 117 is already under some compression in the position shown in FIG. 16, the gasket preferably being of a size somewhat larger, in its relaxed state, than the recess 127 provided for it.

The toothed coupler of FIGS. 14-17 is particularly suitable for use with a rectangular groove in which where the radial face 144 of the groove 103 is square to the bottom of the groove, and the width of the band 105, that is, the distance between the end face 104 of the grooved pipe and the radial face 144 of the groove 103, is greater than the distance between the face 147 of the coupler 106 and the leading edge face 148 of the teeth 119, for on tightening of the bolts this will cause the leading edge of the teeth 148 to start to dig into the radial face of the groove 144. In such a coupler as illustrated in FIGS. 14-17 the arrangement would be such that the distance from the face of the key section 120 to the face of the flange of the coupler 147 would be greater or just equal to the maximum extent of the distance from the end of the pipe 104 to the radial face 144 of the groove 103 so that at no time would the face of the pipe 104 extend beyond the face 147 of the coupler.

In practice, the band width 5 or 105 may vary due to different grooving arrangements and also due to tolerances and the thickness of the coupler, i.e., the distance between the faces 147 and 148 may also vary because of manufacturing tolerances. In the embodiment of FIGS. 1-7 the allowance for such variation could result in such a gap between the pipe flange and the face 47 of the coupler that the gasket might try to extrude outwardly under internal pressure, with resultant damage to the gasket and leakage of the pipe contents. Pressure applied to the gasket could be so great as to damage the gasket The modified arrangement of FIGS. 14-17 achieves a rigid coupling without the possibility of large undesirable gaps or extreme stress on the gasket 117. The gasket 117 does not have any portion extending in front of the surface 147 after final assembly and has been completely compressed into the recess 127 as shown in FIG. 17 and so is immune to extrusion or blow out.

FIG. 17 illustrates the final tight condition of a rigid joint after the bolt 121 has been tightened up from the position shown in FIG 16. The face 147 of the coupler is pressed tightly against the flange 131. It will be seen that in FIG. 17 the teeth 119 have dug into the wall 144 of the groove 103. The wall 144 could also be considered a pipe shoulder if the coupler is used with shouldered instead of grooved pipe. The sharp teeth do not simply abut against the wall 144 but actually imbed themselves in the pipe material, preventing any relative rotation.

It can readily be seen from FIG. 17 that end pull forces will tend to cause greater penetration of the teetch 119 by pulling the pipe toward the face 120 of the key section. The extent to which this effect occurs depends upon the forces acting and the resistance offered by the teeth 119, but it is conceivable that the pipe could be pulled far enough for the toe 120 of the key 118 to come into contact with the groove wall 144, at which point no further movement could take place. THe size of the teeth 119 can be chosen accordingly.

It is preferable that the material into which the teeth 119 have to penetrate be no harder than the teeth 119 themselves. In the case of harder pipe materials such as cast iron ductile iron the use of teeth to insure rigidity is not so advantageous as with softer pipe materials, though the arrangmeent is still practicable if the relative dimensions of the elements are carefully worked out. More brittle materials such as cast iron raise further difficulties.

Figure 18:
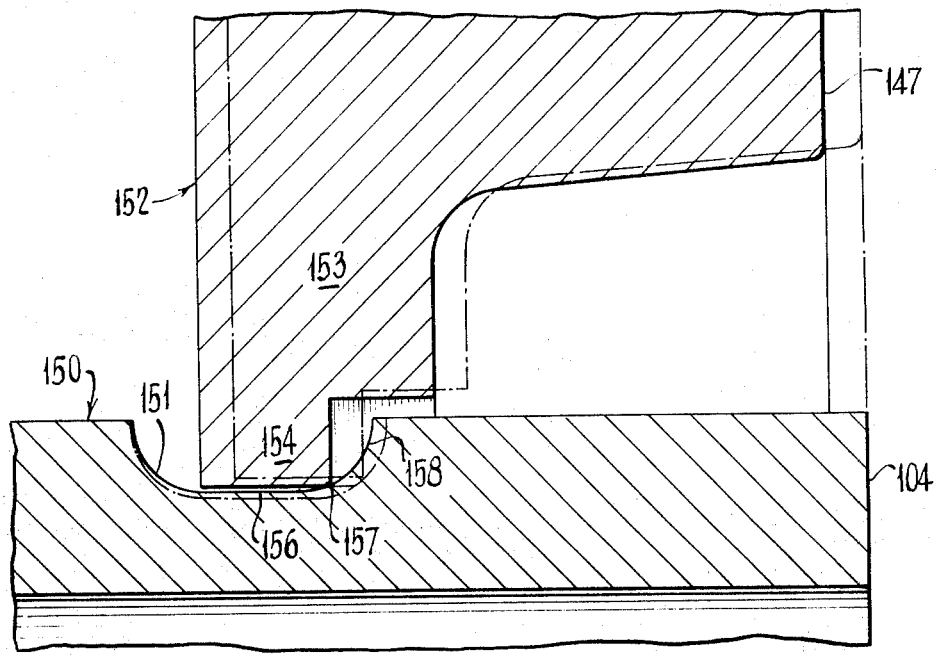
FIG. 18 is an enlarged longitudinal sectional detail view illustrating the interaction of a radiused groove and a rectangular key section.
Figure 19:
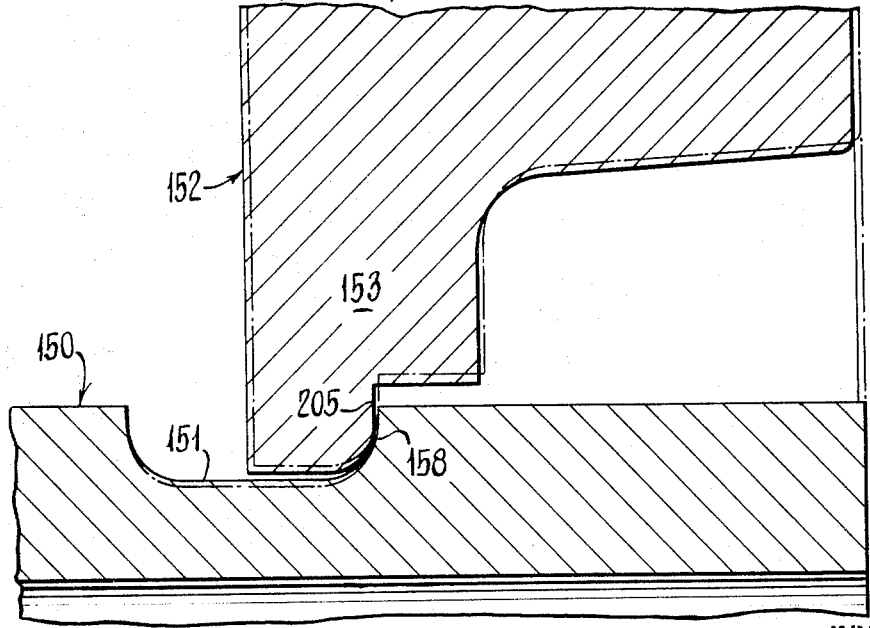
FIG. 19 is a view similar to that of FIG. 18 but with a rounded key section.

It is standard practice in grooving cast iron materials to provide a radius in the root of the groove as shown in FIGS. 18 and 19. The object of the rounded groove is to strengthen the pipe particularly by reducing stress concentrations at the root of the groove and countering the effect of notch sensitivity to which all brittle materials are susceptible. FIGS. 18 and 19 show a pipe wall having a rounded or radiused groove 151.

FIG. 18 shows a portion of a coupler, which could be of the type shown in FIGS. 1-7 or of the toothed type illustrated in FIGS. 18-19, since both types have generally squared-off, stepped key sections. In FIGS. 18 and 19 the coupler is generally indicated by the reference number 152 and the key section by the reference numeral 153. In FIG. 18 the key section 153 terminates in a narrower lip or toe 154 having a flat face 155 arranged normal to the bottom 156 of the groove 151. Reference numeral 157 indicates the right angled edge of the toe or lip 154 which contacts the curved wall 158 of the groove 151. Shadow lines illustrate the effect of variations in groove and key depth i.e., of the diameters of the annular groove and annular key. In particular the shadow lines illustrate the influence of the dimensions on the points of contact between the toe edge 157 of the key section 153 and the curved wall surface 158 of the radiused groove. The groove diameter is the maximum permitted and the key is of the minimum diameter. The shadow lines illustrate maximum key diameter and minimum groove diameter. Considering this illustration in view of the criticality of the band width 5 or 105 discussed above it will be clear that the use of a radiused groove necessarily introduces further variations into the distance the pipe end 104 projects beyond the face 147 of the coupler before tightening of the coupler into place. Attempting to avoid the undesirable effects of variations in dimensions while at the same time seeking rigidity of the coupling could result in large gaps through which a gasket (not shown in FIGS. 18 and 19) would tend to extrude itself.

FIG. 19 shows a solution to the problem illustrated in FIG. 18 by providing a radius on the leading face of the toe 205 of the key section. The curved surface 205 conforms to the contour of the wall 158 of the radiused groove and thereby greatly reduces the undesirable effects of dimensional variations. Shadow lines in FIG. 19 show the greatest change in location which dimensional variations could produce. Comparison with FIG. 18 shows the marked advantages inherent in the use of a radiused or bevelled toe for the key section 153 when used in connection with a radiused groove. A further advantage is that the bevelled or radiused key is more readily accomodated by the radiused groove, permitting the use of a narrower groove than that which would be needed for a key of rectangular cross section. Upon tightening of a coupler having a curved key as in FIG. 19, the key face 205 is forced to assume the tightest possible relationship with the curved groove wall 158, and no undesirable slippage occurs.

Many variations and modifications of the construction illustrated in the accompanying drawing and described in the foregoing text will obviously suggest themselves to those of oridinary skill in the art. Such modifications and variations are within the spirit and scope of this invention. What is disclosed is a new and economical construction for joints of pipe fittings, and more particularly, a coupling arrangement for rigid joints.

What is claimed is:

1. A hinged flanged coupler for coupling a pipe to a flange formed on the end of an adjacent member comprising annular segments hingedly connected for positioning at a joint as a complete annulus having substantially planar front and rear faces for connection to a flange by means of bolts passing through bores from front to rear of said annulus, each segment having rounded end portions the thickness of which is approximately half the thickness from front to rear of said complete annulus, said end portions of adjacent segments overlapping, a tubular sleeve extending through aligned bores in a pair of said overlapping end portions holding said segments in assembled relationship while permitting hinged opening of the annulus to receive a pipe end therewithin, bores formed in other end portions of said segments for reception of a bolt to retain said segments in closed annular relationship about a pipe end, a recess formed in the front face of said segments for reception of a gasket, and key means extending inwardly from the inner periphery of said segments rearward of said recess, said key means carrying means for abutting against and engaging a generally radial surface of a pipe for rigidly securing said pipe to said flange.

2. The coupler of claim 1 wherein said key means carries a plurality of sharp teeth for engaging said generally radial surface.

3. The coupler of claim 1 wherein said generally radial surface is the wall of a groove in said pipe and said key means carries a plurality of sharp teeth for biting into said groove wall upon tightening of the coupler.

4. The coupler of claim 1 wherein said key means has a plurality of equally spaced sharp teeth formed integrally with said key means.

5. The coupler of claim 1, said segments throughout the extent thereof being formed with equally spaced bolt receiving bores radially equidistant from the center of said annulus.

6. The coupler of claim 1 and including lugs extending laterally from said segments and radially extending adjustable means carried by said lugs.

7. The coupler according to claim 1 wherein said key means has a toe portion with curved profile for fitting tightly against the curved wall of a radiused groove in said pipe.

8. The coupler according to claim 13 wherein said recess is an annular recess adjacent said key means for reception of a generally annular sealing gasket therebetween.

9. In coupling construction for coupling a pipe to a flanged element, the arrangement comprising: a pipe having a circumferential groove formed therein, a pair of members formed to encompass said pipe, said members being semicircular and hinged together at one overlapping pair of their ends and detachably secured at the other ends, said members being formed to extend radially outward from said pipe in the form of an annular flange, bores through said members extending parallel to the pipe axis for receiving fasteners to secure said pipe to a flanged element, a recess in said members for reception of a gasket, a gasket seated in said recess, and key sections on said member formed with a plurality of sharp teeth for tightly fitting into the groove in said pipe and biting into the material of the pipe at said groove, whereby the coupling is of the rigid type.

* * * * *

UNITED STATES PATENT OFFICE
CERTIFICATE OF CORRECTION

Patent No. 3761114            Dated September 25, 1973

Inventor(s) James Blakeley

It is certified that error appears in the above-identified patent and that said Letters Patent are hereby corrected as shown below:

| | |
|---|---|
| In the heading: Item (73), | The assignee should be --Victaulic Company of America, South Plainfield, New Jersey-- |
| In the Abstract, line 13, | "basket" should read --gasket--. |
| Column 10, line 26, | "teetch" should read --teeth--. |
| line 53, | "18-19" should read --14-17--. |
| Claim 8, line 1, | "13" should read --1--. |

Signed and sealed this 2nd day of July 1974.

(SEAL)
Attest:

EDWARD M. FLETCHER, JR.
Attesting Officer

C. MARSHALL DANN
Commissioner of Patents